United States Patent Office 3,494,312
Patented Feb. 10, 1970

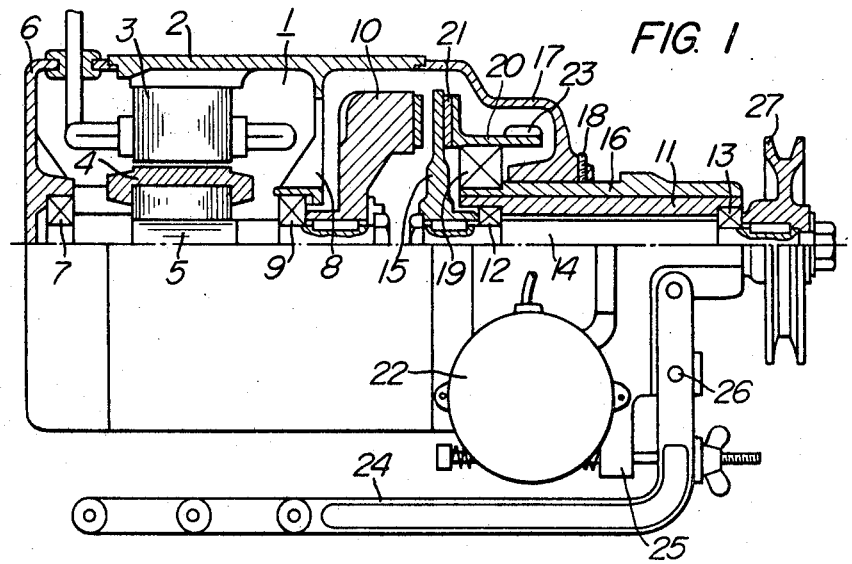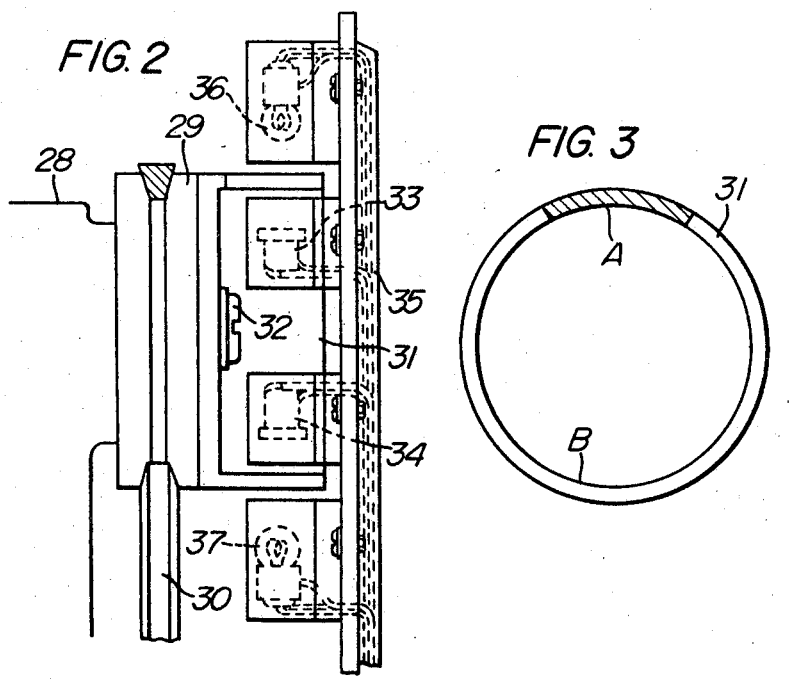

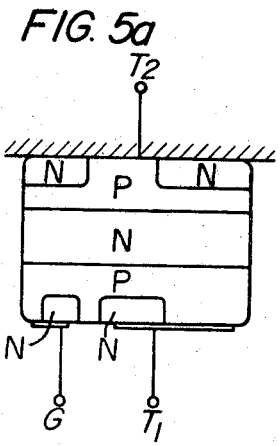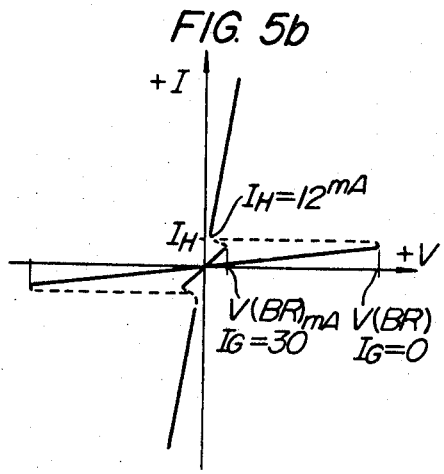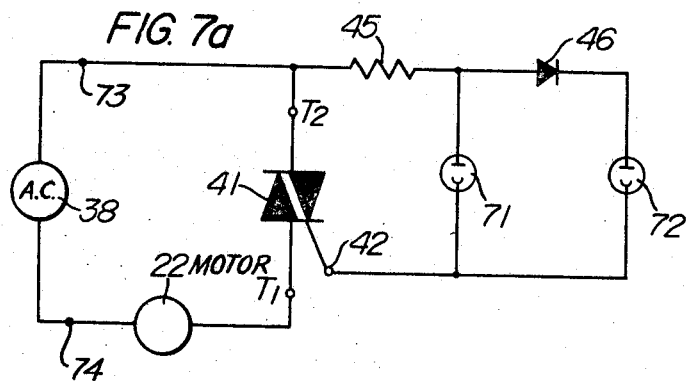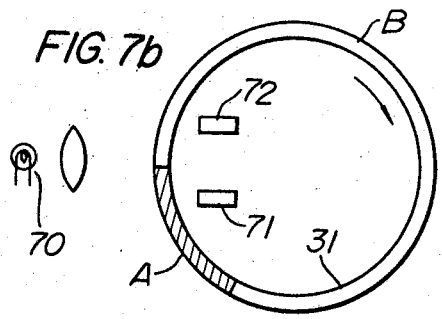

3,494,312
DEVICE FOR PRECISELY STOPPING SEWING MACHINE MOTORS
Kuniaki Kubokura and Kenjiro Yokoyama, Hitachi-shi, Japan, assignors to Hitachi, Ltd., Tokyo, Japan, a corporation of Japan
Filed Apr. 7, 1966, Ser. No. 540,881
Claims priority, application Japan, Apr. 9, 1965, 40/20,857; May 14, 1965, 40/27,890
Int. Cl. D05b 69/12; H02b 3/24
U.S. Cl. 112—219       10 Claims

ABSTRACT OF THE DISCLOSURE

An alternating current driven sewing machine in which a main motor and an auxiliary motor are exchangeably connected to the sewing machine drive pulley, and in which the auxiliary motor is energized by an A.C. source through a bidirectional triode thyristor and the loading mechanism of said auxiliary motor is automatically and precisely stopped at a predetermined fixed point by the switch mechanism inserted in the gate circuit of the thyristor.

---

The present invention relates to a device for operating an A.C. motor and in more detail to a device for operating an A.C. motor by means of which an electrical brake is applied to the A.C. motor to stop the motor, whereby the loading mechanism of the A.C. motor is automatically and abruptly stopped at a predetermined position.

An object of the present invention is to provide a device for operating an A.C. motor by means of which an electrical brake is applied to the A.C. motor when the A.C. motor is desired to be stopped, to thereby stop the A.C. motor abruptly and also to precisely stop the loading mechanism of said motor at a predetermined position.

Another object of the invention is to provide a device for operating an A.C. motor by means of which the position of a load is optically determined momentarily and the data thus determined is used to control an electrical brake mechanism so as to automatically stop the loading mechanism at a predetermined position.

Still another object of the present invention is to provide a device for operating an A.C. motor in which the number of parts in the circuit thereof is reduced as a whole by employing a bidirectional triode thyristor (silicon gate-controlled A.C. switch) in said circuit and which therefore is highly reliable and easy to maintain.

Still another object of the present invention is to provide a device for operating a sewing machine motor, which is adapted to automatically stop the sewing needle at its upper position or lower position as desired to thereby simplify the sewing operation.

The present invention will now be described in further detail below with reference to the accompanying drawings, in which:

FIGURES 1 through 4 illustrate an embodiment of the present invention as applied to a sewing machine motor for braking and stopping said motor, in which:

FIGURE 1 is a fragmentary front elevational view in vertical cross section of the electric motor;

FIGURE 2 is a side elevational view in section of a sewing needle position detecting mechanism;

FIGURE 3 is a front elevational view of a revolving tube which constitutes a part of said sewing needle position detecting mechanism; and FIGURE 4 is a wiring diagram controlling an auxiliary motor for braking;

Figure 4:
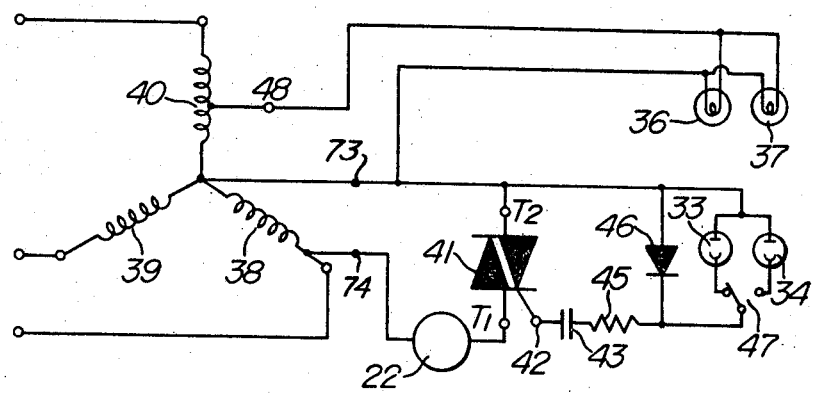
Figure 6A:
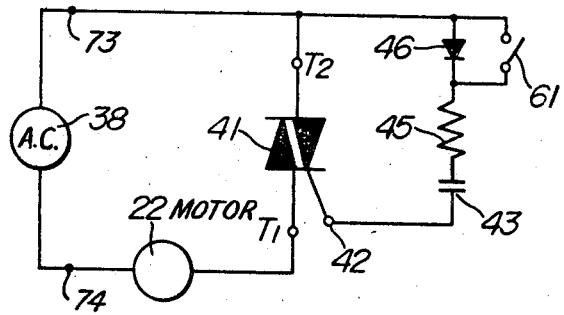
Figure 6B:
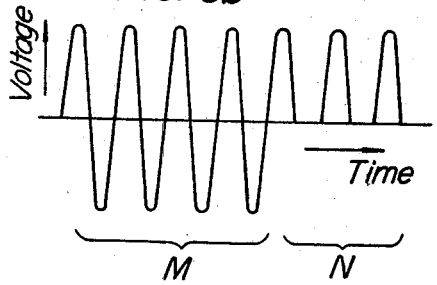

FIGURES 5(a) and 5(b) are a cross sectional view showing the pellet structure of an example of the bidirectional triode thyristor and a chart showing the A.C. volt-ampere characteristics thereof respectively; and FIGURES 6(a) and 7(a) are wiring diagrams illustrating brake mechanisms for an A.C. motor, which constitute an essential portion of the present invention, in which:

FIGURE 6(a) is a wiring diagram of a device which is operated by means of a manual switch to start or stop the A.C. motor and FIGURE 6(b) is a waveform diagram relating to the operation of the device of FIGURE 6(a); and FIGURE 7(a) is a wiring diagram of a device in which a photoconductive cell is employed in the switch mechanism, thereby to stop the A.C. motor automatically, and FIGURE 7(b) is a detailed illustration of a part of the device used in the circuit of FIGURE 7(a).

In describing the construction of the device for operating a sewing machine motor with reference to FIGS. 1 through 4 and particularly to FIG. 1, reference numeral 1 indicates a main motor whose stator 3 is disposed within a housing 2. A rotor 4 is supported by a rotary shaft 5 which is journaled in a bearing 7 provided in an end bracket 6 and a bearing 9 provided in an intermediate partition 8 in the housing 2. A driving disc 10 is connected to the end of the rotary shaft 5 extending through the bearing 9 and arranged in opposed relation with a clutch disc 15 disposed at the inner end of an output shaft 14 which is mounted in an inner sleeve 11 through bearings 12 and 13. The inner sleeve 11 is supported by an end bracket 17 through the intermediary of an outer sleeve 16 which is secured to said end bracket 17 by means of a screw 18. Inside of the outer sleeve 16 is mounted a brake ring 20 through a bearing 19, said brake ring 20 being provided with a friction disc 21 facing said clutch disc 15 and a worm wheel gear 23 adapted to engage with an auxiliary motor 22. An actuating lever 24 is fixed to a support arm 25, extending from the outer sleeve 16, by a pin 26 and, by the operation of said lever, the inner sleeve 11 is moved back and forth so that the clutch disc 15 is brought in contact with either the driving disc 10 or friction disc 21. A pulley 27 is mounted to the outer end of the output shaft 14 and is connected with a pulley 29 provided on a sewing machine 28 by means of a belt 30 as shown in FIG. 2.

Referring now to FIG. 2, reference numeral 31 is a revolving tube consisting of a transparent portion B and an opaque portion A as shown in FIG. 3 inside of the revolving tube 31, there are disposed photoconductive cells 33 and 34 which are arranged with a phase difference of 180° (corresponding to the upper and lower positions of the sewing needle) and fixed to a bracket 35. Light source lamps 36 and 37 are fixed to the bracket 35 in such a manner as to oppose the photoconductive cells 33 and 34 respectively with the revolving tube 31 intervening therebetween.

Next, the wiring diagram of the device described above will be explained with reference to FIG. 4. Reference numerals 38, 39 and 40 are single phase coils for the main motor 1 respectively, of which any one, for example, coil 38 has both ends thereof connected to the terminals 73 and 74 which may be considered as an A.C. power source. The auxiliary motor 22 is connected to the terminals 73 and 74 through a bidirectional triode thyristor 41. A condenser 43, resistance 45 and diode 46 are connected to the gate electrode 42 of the bidirectional triode thyristor 41 in series and the diode 46 is connected to one of two photoconductive cells 33 and 34 in parallel by means of a change-over switch 47. The light source lamps 36 and 37 are connected to a tap 48 which extends from an intermediate point on any one, for example, coil 40 and through which a power is supplied to said lamps.

In order to illustrate the operation of the device for operating a sewing machine motor, shown in FIGS. 1 through 4, the bidirectional triode thyristor, used as a component part of the device of the present invention, the characteristics thereof and the device for stopping the operation of an A.C. motor, in which said thyristor is used, will be described first.

FIG. 5a is a cross sectional view showing the pellet structure of the bidirectional triode thyristor. As shown in FIG. 5a, two four-layer diodes, i.e. one p-n-p-n type diode and one n-p-n-p type diode, are connected in parallel between terminals $T_1$ and $T_2$, to which is added an n-layer as an electrode G to form a five-layer diode.

The A.C. volt-ampere characteristic of the bidirectional triode thyristor described above is shown in FIG. 5b by way of example, in which it will be noted that the relative characteristic between the voltage V of the terminal $T_2$ and the ampere I of a current flowing from the terminal $T_2$ to terminal $T_1$, with respect to the terminal $T_1$, appears in exactly a symmetrical relation in both the first and third quadrants depending upon the value of a current flowing from the gate electrode G to the terminal $T_1$, that is a gate current $I_G$, being plus or minus. The element is designed such that a brake-over voltage V(BR) is higher than the highest value of the applied A.C. voltage when the gate current $I_G$ is zero. However, when a gate current of a predetermined value is flowing, the current is conducted from $T_2$ to $T_1$ at a far lower voltage than the brake-over voltage V(BR) when $I_G$ is zero. Once the current flows from $T_2$ to $T_1$, the current flow continues until the current I flowing through the terminal $T_2$ drops below the holding current $I_H$, irrespective of the gate current. When the current I drops below the holding current $I_H$, the current flow from $T_2$ to $T_1$ is interrupted.

FIG. 6a is a wiring diagram for a device in which the above described bidirectional triode thyristor is used, whereby starting or stopping of an A.C. motor is effected by a manual switch. In FIG. 6a, similar numerals to those used in FIG. 4 indicate similar parts and therefore no explanation will be repeated. In this device, as will be seen in FIG. 6a, a series circuit consisting of a condenser 43, resistance 45 and diode 46 is connected between the gate electrode 42 and terminal $T_2$ of the bidirectional triode thyristor 41 and further, a manually operative control switch 61 is connected to the diode 46 in parallel.

When the switch 61 is in a closed position in the construction described, a current for charging the condenser 43 flows throughout the entire cycle of the A.C. power source voltage. Since this current flows through the gate electrode 42 of the bidirectional triode thyristor 41, said element 41 is rendered conductive, through which an A.C. voltage shown in FIG. 6b(M) is applied to the A.C. motor 22 for normal operation of the same. When the operation of the A.C. motor 22 is desired to be stopped, the switch 61 is opened, whereupon the current flowing through the condenser 43 is limited to a half cycle zone of the complete one cycle of the A.C. power source, which in turn renders the bidirectional triode thyristor conductive only within a half cycle zone. Accordingly, the voltage applied to the A.C. motor 22 is reduced to the half cycle zone as shown at a portion N of FIG. 6b. As a result, a direct current flows through the A.C. motor 22, so that the motor is subjected to direct current braking and the speed of the motor is reduced sharply. As long as the voltage is within this half cycle zone, the current flows continuously in the direction from $T_2$ to $T_1$, until the charging current for the condenser 43 renders the bidirectional triode thyristor 41 non-conductive and, during this period, an electrical brake is applied to the A.C. motor 22. Thereafter, the bidirectional triode thyristor 41 is non-conductive and current supply to the A.C. motor 22 is interrupted.

FIG. 7a shows an embodiment of the device in which a photoconductive cell is employed as switching means in lieu of the manual switch shown in FIG. 6a for braking and stopping an A.C. motor automatically. Referring to the wiring diagram shown in FIG. 7a, a main control switch of photoconductive cell 71 is connected between the gate electrode 42 and terminal $T_2$ of the bidirectional triode thyrisor 41 through the resistance 45. Reference numeral 72 is a delay switch of another photoconductive cell, which is connected to the main control switch 71 through the diode 46 in parallel. The main control switch 71 and delay control switch 72, as shown in FIG. 7b, are disposed in a revolving tube 31 with a certain phase angle therebetween, said revolving tube 31 consisting of a transparent portion B and an opaque portion A, and a light source 70 is provided outside of said revolving tube 31 in opposed relation with said main control switch 71 and delay control switch 72.

With the construction described, when the revolving tube 31 rotates in the direction shown by an arrow in FIG. 7b and the transparent portion B is located between the main control switch 71 and the delay control switch 72, and the light source 70, both of the control switches 71 and 72 are rendered conductive, which in turn renders the bidirectional triode thyristor 41 conductive throughout the entire cycle. Thus, an A.C. full voltage is applied to the A.C. motor 22, enabling said motor to perform normal operation. Then, the opaque portion A of the revolving tube 31 comes in between the light source 70 and the main control switch 71, whereupon the main control switch 71 is rendered non-conductive and the A.C. current flowing through the gate electrode 42 of the bidirectional triode thyristor 41 is interrupted. In this case, however, since the delay control switch 72 still remains conductive, a current of the forward half cycle of the diode 46 flows through the gate electrode 42 of the bidirectional triode thyristor 41, i.e. said thyristor 41 is conductive at the forward half cycle of the diode 46 and a half wave rectified voltage is applied to the A.C. motor 22. As such, the A.C. motor 22 is subjected to a D.C. excitation, with the consequence that the rotation of the rotor is braked by direct current and the r.p.m. thereof decreases abruptly. After a predetermined period of time, the opaque portion A of the revolving tube 31 proceeds between the light source 70 and the delay control switch 72, whereby said delay control switch 72 is released and the bidirectional triode thyristor 41 is rendered completely non-conductive and the A.C. motor 22 is disconnected from the terminals 73 and 74 of the A.C. power source.

According to the device shown in FIG. 7a, starting or stopping of an A.C. motor can be effected in a very simple manner and particularly it is possible to stop the motor abruptly. Therefore, the loading mechanism of the A.C. motor can be stopped at a predetermined location easily.

Now, the operation of the device for operating a sewing machine motor, shown in FIGS. 1 through 4, will be explained. The main motor 1 is operating continuously with the driving disc 10 rotating. When the actuating lever 24 is pulled downwardly of FIG. 1 under this condition, the inner sleeve 11 is pressed inwards, whereupon the clutch disc 15 comes in contact with the driving disc 10. The rotational force of the rotor 4 of the main motor 1, therefore, is transmitted to the pulley 27 through the rotary shaft 5, driving disc 10, clutch disc 15 and output shaft 14 in that order, and further to the pulley 29 mounted to the sewing machine 28 by means of the belt 30. In this case, since the rotary cylinder 31 is rotating at high speeds, the photoconductive cells 33 and 34 are rendered conductive, therefore the diode 46 is shorting. Thus, an A.C. current flows through the gate electrode 42 of the bidirectional triode thyristor 41 and, after passing through said element, is fed to the auxiliary motor 22 to operate the same. The operation of the auxiliary motor 22 causes the brake ring 20 to rotate through the worm gear 23. When the operation of the sewing machine is desired to be stopped, the actuating lever 24 is returned to its original position to draw the inner sleeve 11 outwardly, whereupon the clutch disc 15 is disengaged from the driving disc 10 to come in contact with the friction disc 21 on the brake ring 20, which is being driven at a low rate by the auxiliary motor 22, and rotates with the friction disc at a low rate. Consequently, the rotational speed of the pulley 29, mounted on the sewing machine 28, is reduced, so that the sewing needle is operated slowly. Since the rotational speed of the revolving tube 31 is also reduced at the same time, in the case when the change-over switch 47 is connected, for example, with the photoconductive cell 33, the opaque portion of the revolving tube intervenes between the photoconductive cell 33 and the light source lamp 36 when the sewing needle is at its upper position and the charging current for the condenser 43 flowing through the diode 46 flows through the gate electrode 42 of the bidirectional triode thyristor 41 only for a limited time. During this period, the bidirectional triode thyristor 41 conducts the current only in a half cycle zone, so that the auxiliary motor 22 is braked by direct current and stopped abruptly. Therefore, the sewing needle is stopped at its upper position.

On the other hand, when the change-over switch 47 is connected with the photoconductive cell 34 on the other side, the auxiliary motor 22 stops its operation in the manner described when the opaque portion A of the revolving tube 31 comes to the lower side and therefore the sewing needle stops at its lower position.

In order to re-start the sewing machine 28, the actuating lever 24 is pulled, whereupon the clutch disc 15 is brought in contact with the driving disc 10 to rotate the pulley 29 at high rates and thus the sewing machine 28 is operated. Simultaneously the revolving tube 31 is rotated at high rates, permitting the photoconductive cells 33 and 34 to be illuminated by the light source lamps 36 and 37 respectively. As a result, an A.C. current flows through the condenser 43 and fed to the auxiliary motor 22 through the bidirectional triode thyristor 41 to re-start said motor.

Examples of the numerical data of the device for operating a sewing machine motor, illustrated in FIGS. 1 through 4, will be given below: The characteristics of the bidirectional triode thyristor used are: V(BR)=270 v. when $I_G$=0 and V(BR)=5 v. when $I_G$=30 ma. The main A.C. motor 1 is of A.C. 200 v., 400 watt and 3000 r.p.m. while the auxiliary motor 22 is of AC. 115 v., 10 watt and 3000 r.p.m. The rotation of the auxiliary motor is reduced at the gear ratio of about 30:1 and thereafter is changed by the belt pulleys at the ratio of about 1:2, so that the actual r.p.m. of the machine pulley is from 150 to 200 r.p.m. The revolving tube 31 consists of a plastic cylinder having a diameter of about 90 mm. and the opaque portion A is provided on a peripheral portion thereof over a circumferential length corresponding to a central angle of about 60°.

The device described above is highly advantageous as a driving source for industrial sewing machines in that the sewing needle can be stopped easily either at its upper position or lower position by the simple operation of the change-over switch 47.

Furthermore, each of the devices according to the present invention, in which the bidirectional triode thyristor is used, has the advantage that the number of circuit parts can be reduced as a whole and consequently the maintenance operation is rendered easy and reliability is enhanced.

It should be understood that the present invention is not restricted to the embodiments described above but many modifications are possible without impairing the spirit of the present invention. For example, in the sewing machine motor device shown in FIGS. 1 through 4, the revolving tube 31 mounted to the pulley 29 may be replaced by a disc-shaped element or further by a reciprocating mechanism which is adapted to cause a reciprocatory vertical movement of the sewing needle. Still further, a rectifier means operative in association with the sewing needle may be used for the detection of the needle position. The scope of the present invention, therefore, covers the foregoing modifications which are feasible without impairing the spirit of the invention.

What is claimed is:

1. A device for operating an A.C. motor, which comprises a series closed circuit composed of an A.C. power source, an A.C. motor and a bidirectional triode thyristor having a gate electrode; a series circuit composed of a condenser and a diode connected to a point on said series closed circuit and to the gate electrode of said thyristor; and a control switch connected to said diode in parallel thereto.

2. A device for operating an A.C. motor, which comprises a series closed circuit composed of an A.C. power source, an A.C. motor and a bidirectional triode thyristor having a gate electrode; a main control switch connected to a point on said series closed circuit and to the gate electrode of said thyristor; and a series circuit composed of a timed control switch and a diode connected to said main control switch in parallel thereto.

3. A device for operating a sewing machine having a drive pulley and a reciprocal sewing needle, which comprises a main motor and an auxiliary motor, connecting means for selectively connecting the sewing machine drive pulley to either the main motor or the auxiliary motor such that the connection can be selectively changed from one to the other, a series closed circuit including a bidirectional triode thyristor having a gate electrode and being connected to said auxiliary motor in series with an A.C. power source; a condenser and a diode, connected in series to a point on said series closed circuit and to the gate electrode of said thyristor, detecting means for selectively detecting the upper or lower position of the sewing needle and switch means responsive to said detecting means and connected to said diode in parallel thereto for selectably short circuiting said diode at said upper or lower portion of the sewing needle.

4. A device as defined in claim 3 wherein said detecting means includes a rotational detecting element having transparent and opaque portions and being driven by said drive pulley, said switch means including two photoconductive cells selectively connected in parallel with said diode and being arranged in opposed relation with light sources, said rotational detecting element intervening between said photoconductive cells and said light sources.

5. A device as defined in claim 4 wherein said light sources are positioned at locations corresponding to the upper and lower positions of the sewing needle.

6. A device as defined in claim 3 wherein said connecting means includes a drive shaft in driving engagement with said drive pulley and clutch means selectively connecting said drive shaft to said main motor only in a first position thereof and said auxiliary motor only in a second position thereof.

7. A device for operating a sewing machine having a drive pulley and a reciprocal sewing needle, which comprises a main motor and an auxiliary motor, connecting means for selectively connecting the the drive pulley to either the main motor or the auxiliary motor such that the connection can be selectively changed from one to the other, a series closed circuit including a bidirectional triode thyristor having a gate electrode and being connected to said auxiliary motor in series with an A.C. power source, a main control switch connected to a point on said series closed circuit and to the gate electrode of said thyristor, a second series circuit composed of a delay control switch and a diode connected in parallel with said main control switch, detecting means for selectively detecting the upper or lower position of the sewing needle and switch control means responsive to said detecting means for selectively opening said main switch and said delay switch sequentially with an interposed time delay at said upper or lower position of the sewing needle.

8. A device as defined in claim 7 wherein said switch control means includes a transparent rotational element driven by said drive pulley and having an opaque portion, said main switch and said delay switch being provided as respective photoconductive cells arranged in opposed relation with light sources, said rotational element intervening between said photoconductive cells and said light sources.

9. A device as defined in claim 8 wherein said light sources are positioned at locations corresponding to the upper and lower positions of the sewing needle.

10. A device as defined in claim 7 wherein said connecting means includes a drive shaft in driving engagement with said drive pulley and clutch means selectively connecting said drive shaft to said main motor only in a first position thereof and said auxiliary motor only in a second position thereof.

References Cited

UNITED STATES PATENTS

| | | | |
|---|---|---|---|
| 2,958,302 | 11/1960 | Frankel et al. | 112—219 |
| 3,149,593 | 9/1964 | Johnston | 112—219 |
| 3,186,366 | 6/1965 | Haas et al. | 112—219 |
| 3,358,628 | 12/1967 | Kosrow et al. | 112—219 |
| 3,095,534 | 6/1963 | Cockrell | 318—345 |
| 3,421,063 | 1/1969 | Reinke | 318—212 |

OTHER REFERENCES

Gutzwiller and Howell; Economy Power Semiconductor Applications; General Electric 671.1, March 1965; pages 7, 21, and 22.

ORIS L. RADER, Primary Examiner

A. G. COLLINS, Assistant Examiner

U.S. Cl. X.R.

318—212